United States Patent Office 2,974,094
Patented Mar. 7, 1961

2,974,094

RADIO-SULFOCHLORINATION OF PARAFFINS

James F. Black, Convent, N.J., assignor to Esso Research and Engineering Company, a corporation of Delaware No Drawing. Filed May 16, 1958, Ser. No. 735,668

7 Claims. (Cl. 204—162)

This invention relates to the sulfochlorination of saturated hydrocarbons to produce hydrocarbon sulfonyl chlorides and derivatives thereof. More particularly, it is concerned with the radio-sulfochlorination of paraffins using electromagnetic radiation having a wave length in the range of $10^{-3}$ to $10^2$ A.

This application is a continuation-in-part of Serial No. 563,194, "Preparation of Sulfonates," filed February 3, 1956, by the present inventor and now abandoned.

The sulfochlorination of hydrocarbons by reaction with sulfur dioxide and chlorine gases has been known to the art. The sulfonyl chlorides produced can be converted to sulfonates, which are useful for example as aqueous detergents, thickeners for lubricating greases, detergents for lubricating oil compositions, and the like. Because of the increasing demand for sulfonates, there is a need for a new and improved process for their preparation.

In brief compass, the present invention comprises a sulfochorination process which comprises irradiating with electromagnetic ionizing radiation a reaction mixture consisting essentially of a saturated hydrocarbon having in the range of 4 to 40 carbon atoms, e.g., a paraffin or a naphthene, free sulfur dioxide, chlorine and oxygen to product a mono-substituted hydrocarbon sulfonyl chloride.

This invention is predicated on the surprising finding that the presence of minor amounts of oxygen in the reaction mixture inhibits the formation of hydrocarbon chlorides during the radiochemical reaction, and increases the selectivity of the reaction to the hydrocarbon sulfonyl chlorides. This inhibition of the formation of chlorides is accomplished without appreciably inhibiting the sulfochlorination reaction. This is surprising because it is known that oxygen inhibits sulfochlorination reactions initiated by ultra-violet light. In the prior art, the presence of oxygen in such reactions was considered undesirable and was avoided.

The oxygen is used in the reaction mixture to inhibit the formation of hydrocarbon chlorides in amounts in the range of $10^{-4}$ to $10^{-1}$ mole percent present at any one time per mole of hydrocarbon reactant present. Normally, the mole ratio of oxygen to sulfur dioxide present in the reaction mixture at any one time is in the range of $10^{-3}$ to 2. This finding that oxygen inhibits the formation of hydrocarbon chlorides in the sulfochlorination reaction is important. Any hydrocarbon chlorides that are produced in this reaction appear in or are admixed with the final sulfonate product and seriously detract from its value. The chlorides have a very adverse effect upon the detergency characteristics of the sulfonate and are extremely difficult to separate from the sulfonates. By the method of this invention, a mono-substituted hydrocarbon sulfonyl chloride product can be obtained in yields of 2 to 50 mole percent per pass, based on moles of hydrocarbon feed, with the production of less than 2 mole percent of hydrocarbon chlorides.

The reaction occurring in the present invention may be represented by the following equation:

$$RH + SO_2 + Cl_2 \xrightarrow{O_2} RSO_2Cl + HCl$$

The sulfonyl chloride can be utilized to form corresponding sulfonic acids according to the following equation:

$$RSO_2Cl + H_2O \rightarrow RSO_3H + HCl$$

The sulfonic acids so produced can then be neutralized with the basic reactant compound, such as a metal hydroxide, to form the corresponding metal sulfonate as follows:

$$xRSO_3H + M(OH)_x \rightarrow (RSO_3)_xM + xH_2O$$

wherein M represents a metal and $x$ represents the valence of the metal, usually one or two. The sulfonyl chloride, however, can be directly converted to the corresponding metal sulfonate as is known in the art:

$$xRSO_2Cl + M(OH)_x \xrightarrow{H_2O} (RSO_3)_xM + xHCl$$

As the sulfochlorination reaction proceeds, a monosubstituted product will tend to become di-substituted because of the unselective nature of the ionizing radiation and free radical reactions, and because of the increasing concentration of the mono-substituted product. In the prior art, the di-substitution generally resulted in a molecule containing the sulfonyl chloride group and a chloride group. The presence of oxygen, however, according to the present invention, assures that the second substitution will be a sulfochlorination. It is preferred, however, to recover a mono-substituted product. For this reason, it is desirable to maintain the concentration of the monosubstituted sulfochlorinated product in the reaction mixture under 50 mole percent, preferably under 30 mole percent, especially in a continuous process. The monosubstituted product, as well as water, can be removed by recycle operation wherein a portion of the reaction mixture is removed, separated to obtain the product, and recycled to the reaction mixture.

The presence of olefins detract from the reaction and for this reason it is preferred to use substantially saturated hydrocarbon feed stocks; i.e., less than 1 mole percent olefin is present in the reaction mixture at any one time.

One particularly unusual feature of this invention is the high utilization of energy that is achieved. Over 450 molecules of mono-substituted sulfochlorinated product can quite easily be obtained per ion pair generated in the reaction mixture by the irradiation; i.e., the G value of the reaction is over 1300 moles of product per 100 e.v. of absorbed electromagnetic energy.

The reaction mechanism differs substantially from that obtained through ultra-violet light initiation. Ultra-violet light is of much lower energy and is difficult to utilize commercially because of the problems of light transmittal and absorption. Also, because of the resonance method of absorption of ultra-violet light, a particularly selected frequency of light must be used. Oxyen is an inhibitor for ultra-violet light sulfochlorination reactions, and when present largely overrides the initiation of the reactions.

The reaction is dependent to some extent on the solubility of sulfur dioxide in the hydrocarbon feed stock. For this reason, it is preferred to use as feed stocks saturated hydrocarbons capable of absorbing at least $10^{-3}$ mole fractions of sulfur dioxide in the hydrocarbon at 78° C. In part, because of this solubility effect, it is preferred to operate at a relatively low temperature in the order of 30 to 100° F., although temperatures from 0 up to 400° F. give good results. In this connection, higher pressures improve the reaction. A pressure sufficient to maintain a substantial concentration of the gaseous reactants in the liquids is used. Pressures in the order of 15 to 150 p.s.i. are preferred, although pressures up to 2,000 or 3,000 atmospheres can be used.

The substantially saturated hydrocarbons used as feed stocks in this invention are preferably naphthenes or paraffins having in the range of 4 to 40, especially 10 to 30, carbon atoms per molecule. Sulfonates produced from hydrocarbons containing about 10 to 20 carbon atoms per molecule are particularly useful as aqueous detergents and thickeners for lubricating greases. Sulfonates produced from hydrocarbons containing above 20 carbon atoms are useful as oil detergents, as in automotive engine lubricants. Mixturse of hydrocarbons can, of course, be used, and these can be derived from natural sources such as petroleum refinery streams; e.g., conventional petrolatum and paraffin waxes can be used as feed stocks. Also, purified streams from cycle stocks, solvent extracted lube oil fractions, alkylated naphthenes, and the like can be used.

The gases used in the reaction are preferably substantially anhydrous. They can be admixed with other inert gases; e.g., air can be used as a source of the oxygen. It is preferred to maintain in the reaction mixture at any one time 0.1 to 2.0 moles of sulfur dioxide per mole of hydrocarbon feed. Also, preferably, the mole ratio of chlorine to sulfur dioxide is in the range of 0.001 to 1.0. In some cases chlorinated solvents can serve as a source of the chlorine. The chlorinated solvent can comprise 1 to 50 weight percent of the reaction mixture.

The electromagnetic radiation can be obtained from any convenient source. Thus, the ionizing electromagnetic radiation can be obtained from X-ray machines; from waste materials from nuclear reactors, such as spent fuel elements or portions thereof; from neutron shielded nuclear reactors; and from artificially produced isotopes, such as cobalt 60. The reaction mixture can be exposed to the radiation in a straightforward manner, either batchwise or continuously, in a suitable container or conduit. When using a radioisotope, the reactants can be flowed in, or around the isotope in a plurality of streams. A suitable cobalt 60 gamma radiation source has been described by J. F. Black et al. in the "International Journal of Applied Radiation and Isotopes," volume 1, page 256 (1957).

Neutron radiation will give the same basic reaction as electromagnetic radiation. A process based upon the use of neutron radiation is not, however, practical as it produces from the sulfur atom, radioactive species of appreciable half-lives. A product containing such isotopes has little utility. Further, the use of neutrons prohibits the inclusion of any appreciable amounts of other elements in the reaction mixture, which—although chemically inert—are susceptible to activation to radioactive species by the neutrons. The use of beta radiation from Van de Graaff generators or similar machines is not desirable as it leads to a high local concentration of heat.

The source of the radiation is preferably such that the dose rate obtainable is in the range of 20 to $2\times10^5$, preferably $1\times10^3$ to $3\times10^3$, Rads per minute. Preferably the total dose, or energy absorbed based on the mono-substituted product, is in the range of $10^2$ to $10^{10}$ Rads. The time of irradiation will, of course, depend upon the dose rate obtainable and will normally be in the range of 5 seconds to 10 days or longer.

It will be appreciated that some sulfonic acids will be produced during the course of the reaction by reaction of the hydrocarbons with sulfur dioxide and oxygen. This does not, however, represent a problem because usually the sulfonyl chloride product will be converted to the corresponding sulfonic acid by hydrolysis in the next step in the preparation of the final sulfonate product, or will be converted directly to a sulfonate by reaction with a basic compound.

The sulfonyl chlorides formed in accordance with the present invention can be hydrolyzed to form the corresponding sulfonic acids. This can be readily accomplished by mixing water with the reaction mixture at temperatures in the range of about 0 to 250° F. The sulfonic acids produced in accordance with the present invention can be recovered from the reaction mixture by conventional techniques. More specifically, the sulfonic acids can be extracted from the reaction mixture using water and/or alcohols, such as isopropyl alcohol. During or after this extraction step, the sulfonic acids can be converted to sulfonates by reaction with basic compounds. Usually basic reacting compounds of metals will be employed such as the oxides, hydroxides, carbonates and the like. Usually it is desired to form alkali or alkaline earth metal sulfonates for subsequent use as detergents. Thus, basic reacting compounds of sodium, potassium, calcium, barium, etc. can be employed to convert the sulfonic acids to sulfonates. Specific examples of such basic reacting compounds of these metals include sodium carbonate, calcium oxide, calcium hydroxide potassium hydroxide, barium oxide, barium hydroxide and the like. Stoichiometric proportions can be employed although usually a stoichiometric excess, e.g., 5% to 20% of the basic reacting compound will be employed.

*Example*

The radiation source employed was a pipe of cobalt 60 having a strength of about 1,000 curies prepared by neutron bombardment of naturally occurring metal in a nuclear reactor. The radiation from this cobalt 60 source consisted essentially of gamma rays. 100 ccs. of cetane were charged to a 200 cc. glass reaction vessel which contained a tube ending in a fritted fitting for introducing gases below the surface of the liquid. This glass reaction vessel was placed close enough to the cobalt 60 source to receive irradiation at a rate of 0.24 megaroentgens per hour, which is equivalent to 0.223 Rads per hour with this type of system. The remainder of the reaction conditions and the results are specified in the following table. The table also gives comparative runs showing reactions in the absence of chlorine and in the absence of oxygen at different chlorine to sulfur dioxide ratios.

TABLE

| Run Number | 1 | 2 | 3 | 4 |
|---|---|---|---|---|
| Starting Temperature (° F.) | 77 | 75 | 77 | 150 |
| ΔT (° F.) During Run | 20 | 6 | 6 | 11 |
| Reaction Time (min.) | 120 | 130 | 120 | 98 |
| Flow Rate (cc./min. at 70° F.—1 atm.): | | | | |
| $SO_2$ | 87 | 79 | 87 | 85 |
| $Cl_2$ | 8.1 | | 7.6 | 18 |
| $O_2$ | 108 | 120 | | |
| Mole Ratio $Cl_2/SO_2$ in Feed | 0.103 | | 0.097 | 0.235 |
| Atomic Ratio Cl/S in Product | 0.86 | | 1.09 | 2.00 |
| Molecules/Ion Pair: | | | | |
| Cetyl Sulfonyl Chloride | 475 | 69 | 580 | 1,030 |
| Cetyl Chloride | | | 51 | 1,030 |
| Percent Utilization: | | | | |
| $SO_2$ | 12 | 1.8 | 14 | 26 |
| $Cl_2$ | 56 | | 85 | 100 |
| Percent Cetane Converted to: | | | | |
| Sulfonyl Chloride | 14.6 | [1] 2.2 | 18 | 26 |
| Chloride | | | 2 | 26 |

[1] Calculated as the sulfonate.

Run 1 was carried out according to the teachings of this invention. At the end of the experiment, the reaction mixture was blown for eight hours with $N_2$ to remove dissolved $SO_2$ and $Cl_2$ and then was analyzed for percent sulfur and percent chlorine by bomb combustion methods. This analysis showed 1.95% sulfur and 1.86% chlorine, which shows a yield of 14.6% cetyl sulfonyl chloride plus cetyl sulfonate in a mole ratio of 6/1. In this experiment, chlorine utilization was 55.6% and $SO_2$ utilization was 11.63%. The results of Run 1 show that by using $O_2$ and $Cl_2$ with $SO_2$, it is possible to obtain good yields of cetyl sulfonic acid and cetyl sulfonyl chloride without the production of undesirable alkyl chlorides. Run 1 compared to Run 2 shows that an appreciably larger amount of sulfonate product can be obtained by use of the sulfochlorination reaction as compared to the sulfoxidation reaction. Run 1 compared to Run 3 shows that while the yields of sulfochlorinated product may be slightly less, the carrying out of the reaction in the absence of oxygen results in the appearance of appreciable amounts of the undesirable hydrocarbon chloride in the product. This is further confirmed by Run 4 which shows that if it is attempted to increase yields by increasing the chlorination in the absence of oxygen, as much as half of the product obtained can be chlorides. The undesirable effect of these chlorides is well known to the prior art.

The cetane mono-substituted sulfonyl chloride product obtained is converted to calcium sulfonate as follows:

The reaction product is diluted 1:1 with heptane to lower its viscosity. This solution is then neutralized by being agitated with a 100% excess of freshly hydrated lime suspended in a volume of water equal to that of the reaction product-hexane solution. The bulk of the water used readily separates after this neutralization step and is removed, leaving a stable water in oil emulsion. This is broken by being agitated with an equal volume of 50% $CaCl_2$ solution. The aqueous solution layer is separated and the oil layer is filtered and then stripped to remove solvent.

Having described this invention, what is sought to be protected by Letters Patent is succinctly set forth in the following claims.

What is claimed is:

1. A sulfochlorination process comprising irradiating with radiation consisting of ionizing electromagnetic radiation having a wave length in the range of $10^{-3}$ to $10^2$ A. a reaction mixture consisting essentially of a saturated hydrocarbon having in the range of 4 to 40 carbon atoms per molecule selected from the group consisting of paraffins and naphthenes, 0.1 to 2.0 moles of sulfur dioxide per mole of said saturated hydrocarbon, chlorine, the mole ratio of chlorine to sulfur dioxide being in the range of 0.001 to 1.0, and free oxygen, the mole ratio of oxygen to sulfur dioxide being in the range of 0.0001 to 2; and recovering a mono-substituted hydrocarbon sulfonyl chloride in amounts in the range of 2 to 50 mole percent based on said saturated hydrocarbon, the amount of hydrocarbon chlorides produced being less than 2 moles per mole of said saturated hydrocarbons; the dose rate being in the range of $1 \times 10^3$ to $3 \times 10^3$ Rads/min. and the total dose being in the range of $10^2$ to $10^{10}$ Rads, based on said mono-substituted hydrocarbon sulfonyl chloride.

2. A radio-sulfochlorination process which comprises irradiating a reaction mixture initially consisting essentially of a $C_4$ to $C_{40}$ saturated hydrocarbon, reactive amounts of sulfur dioxide and chlorine and a chloride inhibiting amount of free oxygen, with ionizing radiation consisting of electromagnetic radiation having a wave length in the range of $10^{-3}$ to $10^2$ A., and recovering a mono-substituted reaction product.

3. A process which comprises forming an admixture by bubbling sulfur dioxide, chlorine and oxygen through a $C_4$ to $C_{40}$ liquid saturated hydrocarbon in a reaction zone, the mole ratio of sulfur dioxide to hydrocarbon at any one time in such reaction zone being in the range of 0.1 to 2.0, and the mole ratio of chlorine and oxygen to sulfur dioxide being in the range of 0.001 to 1.0 and 0.0001 to 2, respectively, irradiating the admixture so formed with ionizing electromagnetic radiation having a wave length in the range of $10^{-3}$ to $10^2$ A. at a dose rate in the range of 20 to $2 \times 10^5$ Rads/min., and recovering a mono-substituted reaction product.

4. In a sulfo-chlorination reaction wherein sulfur dioxide and chlorine are reacted with a $C_4$ to $C_{40}$ saturated hydrocarbon under the influence of ionizing electromagnetic radiation having a wave length in the range of $10^{-3}$ to $10^2$ A. to produce a mono-substituted sulfonyl chloride, the improvement which comprises inhibiting the formation of hydrocarbon chlorides by maintaining in the reaction mixture in the range of $10^{-4}$ to $10^{-1}$ mole percent of free oxygen.

5. A process in accordance with claim 1 wherein said saturated hydrocarbon has 10 to 30 carbon atoms per molecule.

6. A process in accordance with claim 2 wherein said saturated hydrocarbon is a $C_{10}$ to $C_{30}$ saturated hydrocarbon.

7. A process in accordance with claim 3 wherein said liquid saturated hydrocarbon is a $C_{10}$ to $C_{20}$ saturated hydrocarbon.

References Cited in the file of this patent

UNITED STATES PATENTS

| | | |
|---|---|---|
| 2,046,090 | Reed | June 30, 1936 |
| 2,174,110 | Reed | Sept. 26, 1939 |

OTHER REFERENCES

Martin: "Chemical and Engineering News," vol. 33 (April 1955), pp. 1425 and 1428.

Ellis et al.: Chemical Action of Ultraviolet Rays (1941), p. 542.